(No Model.)
G. NUTTING.
CYCLOMETER.
No. 555,659. Patented Mar. 3, 1896.
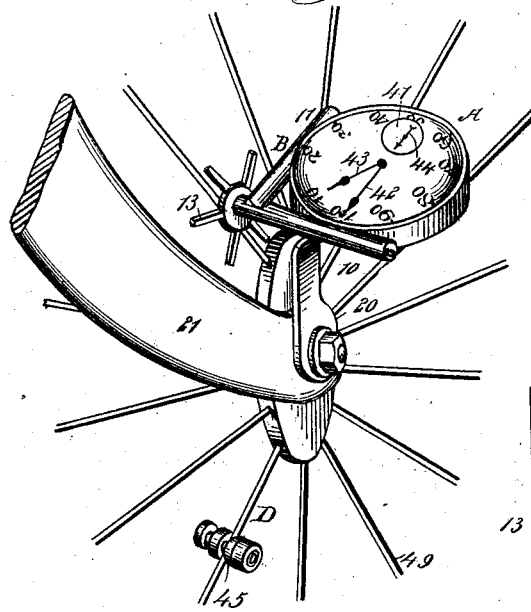
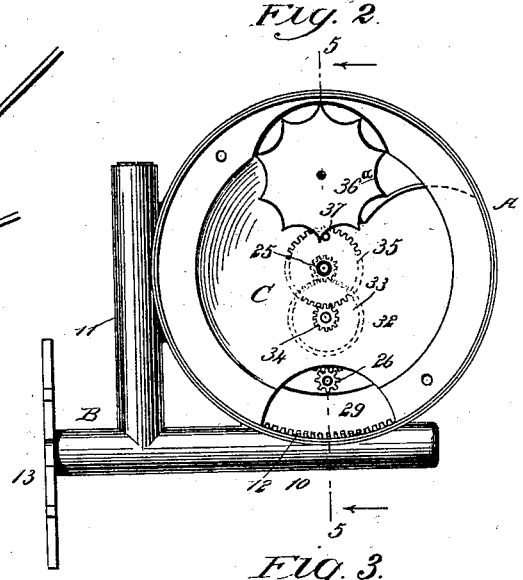
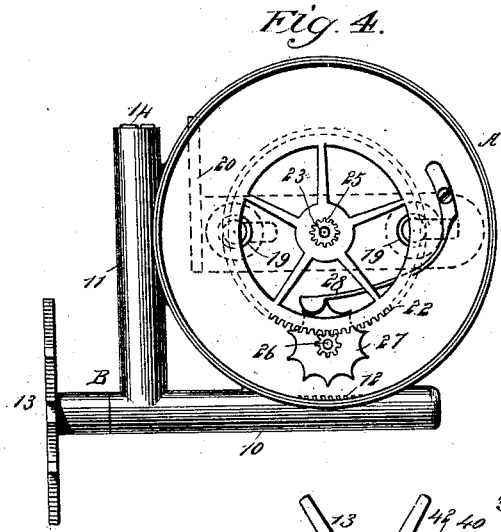
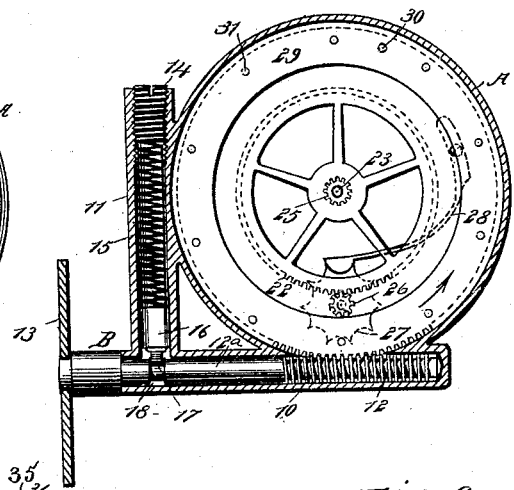
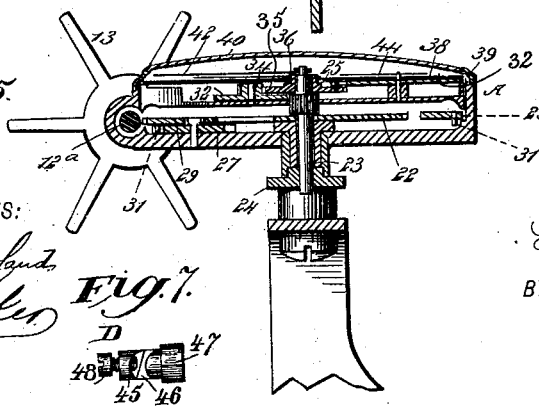
WITNESSES:
Edward O. Rowland
Fred Acker
INVENTOR
G. Nutting
BY
Munn & Co
ATTORNEYS.
ANDREW B. GRAHAM, PHOTO-LITHO. WASHINGTON, D.C.

United States Patent Office.

GRANVILLE NUTTING, OF JERSEY CITY, NEW JERSEY, ASSIGNOR OF TWO-THIRDS TO ISAAC BOEHM AND FERDINAND HECHT, OF NEW YORK, N. Y.

CYCLOMETER.

SPECIFICATION forming part of Letters Patent No. 555,659, dated March 3, 1896.

Application filed April 22, 1895. Serial No. 546,729. (No model.)

*To all whom it may concern:*

Be it known that I, GRANVILLE NUTTING, of Jersey City, in the county of Hudson and State of New Jersey, have invented a new and Improved Cyclometer, of which the following is a full, clear, and exact description.

My invention relates to an improvement in a cyclometer especially adapted for application to bicycles, but it may be used in connection with a wheel of any kind of vehicle.

The object of this invention is to provide a cyclometer so constructed that three hands may be used in connection therewith, one hand being adapted to indicate tenths of a mile and the second hand miles, while the third hand will indicate hundreds of miles; and a further object of this invention is to provide a means whereby by simply reversing one of the gears—the master-gear of the machine—the first hand named will indicate miles, the second hand ten miles for each point it registers with, and the third hand a thousand miles for each point with which it regtsters, thus imparting to the cyclometer a registering capacity of ten thousand miles.

A further object of this invention is to construct a cyclometer in a simple, durable and economic manner, the change in the registering capacity being within the scope of any person of ordinary intelligence.

Another object of the invention is to provide a trip for the cyclometer, adapted to be fastened to the wheel of the vehicle, and to so construct said trip that it may be firmly and securely attached to a spoke of a wheel, and especially to a spoke of a bicycle-wheel.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of a cyclometer, illustrating its application to the wheel of the bicycle. Fig. 2 is a plan view of the cyclometer with the dial removed, together with the hands. Fig. 3 is a horizontal section through the cyclometer, illustrating the master gear or wheel in plan view. Fig. 4 is a plan view of the cyclometer, the master-wheel being removed. Fig. 5 is a section taken vertically through the cyclometer, practically on the line 5 5 of Fig. 2. Fig. 6 is a detail side elevation of the trip adapted to be attached to the wheel of the machine or vehicle, and Fig. 7 is a view thereof at right angles to Fig. 6.

In carrying out the invention a casing A is constructed preferably of circular form and this casing has attached to it in any suitable or approved manner an angular or substantially L-shaped tube B, comprising two members 10 and 11, the member 10 being longer than the member 11. The casing is cut away, in a measure, where the member 10 of the angular tube connects with it, and this member contains a worm 12, the gear of which extends within the casing to a predetermined extent, and at the outer end of the said worm a spur-wheel 13 is secured.

The member 11 of the angular tube B is provided at its outer end with a plug 14 and a spring 15, together with a second plug, 16, the outer plug being screwed or otherwise secured in the said member, while the inner plug is provided with a reduced section 17, which enters an annular groove 18 in the worm, it being understood that the worm-thread does not extend the full length of the member 10, being formed upon a plain shaft $12^a$. The spring 15 serves in connection with the inner plug 16 to prevent the shaft $12^a$ and consequently the worm 12 from being easily turned, thus preventing the revolution of the worm by objects, such as weeds and the like, turning the spur-wheel 13 as the vehicle progresses.

The casing A is provided upon its back with one or more posts 19, and these posts are attached to a bracket 20, which is preferably secured to the fork 21, in which the wheel of the bicycle turns. Within the casing A a gear-wheel 22 is mounted to revolve, the said gear being secured upon a post 23, and the said post is journaled in the casing and at its outer end has a thumb-wheel 24 or its equivalent secured thereto in order that said post may be revolved by hand, if desired. The gear is fast on the post, and just above the gear a pinion 25 is formed upon or secured to the post, as shown in Figs. 3, 4, and 5. The gear 22 is made to mesh with a pinion 26, and said pinion is fast upon a stellated wheel 27, the said wheel being journaled in the casing at one side of its center. The stellated wheel consists preferably of a disk having a number of recesses in its periphery, as shown in Fig. 4, and a spring detent or brake 28 is secured within the casing, being adapted to have constant bearing on the stellated wheel, the head of the brake being made to fit in the peripheral recesses of said wheel.

The master wheel or gear 29 is in the nature of a ring, and the teeth are produced upon the outer periphery, being adapted to engage with the worm or thread 12 on the aforesaid shaft $12^a$, and through the medium of the said worm or thread the ring-gear is revolved. The ring-gear is preferably made of an outside diameter corresponding substantially to the inside diameter of the casing; and this ring-gear is fitted upon one side with a single pin or stud 30, while upon the opposite side the ring is provided with preferably ten pins or studs 31, arranged at equal distances apart, and the positions of the pins 30 and 31 are such that when they are made to face inward and the ring-gear is rotated they will engage one after the other with the stellated wheel 27 to revolve the same against the detent 28.

A cap 32 is made to substantially close one side of the casing, being fitted over the master or ring wheel 29, and this cap is provided with a second opening through which the stud or spindle 23 attached to the central gear 22 passes, together with a predetermined portion of the pinion 25, attached to said stud or spindle, as illustrated in Fig. 3. A hand-train C is mounted on the said cap, and the said train consists of a small wheel 33, mounted to revolve on an arbor secured to the cap, the said wheel being provided with an attached pinion 34 and a second small wheel, 35, which is provided with a hub or sleeve 36, loosely mounted upon a reduced portion of the spindle 23 and above the cap. The gear 33 meshes with the spindle-pinion 25, being rotated thereby, and the gear or wheel 35, loosely mounted on the said spindle 23, is made to mesh with the pinion 34 on the said wheel or gear 33, and in the said cap at one side a recess is ordinarily made in which a stellated wheel $36^a$ is mounted to revolve, being rotated by contact with a pin 37, carried by the wheel or gear 35, as shown in Fig. 2. A dial 38 is placed over the cap, being covered by a suitable bezel 39 and crystal 40. The dial may be marked off as desired. In the drawings it is shown as being marked in tens, reading from "10" to "100," and upon this dial a second dial 41 is made, corresponding substantially to the second-hand dial on a watch, and this second dial may be marked similarly to the large dial, and the spaces between the figures of both the large and the small dial may be and preferably are marked off in similar manner to the spaces between the hour-figures on a watch or clock.

A long hand 42 is secured directly to the main post or spindle 23 of the cyclometer, and corresponds to the minute-hand of a watch or clock. A second and shorter hand 43, corresponding to the hour-hand of a watch, is secured upon the sleeve 36 of the wheel 35 of the train-gear C, while a still smaller hand 44 is made to rotate over the smaller or auxiliary dial 41, being carried by the upper stellated wheel 36.

In connection with the cyclometer a trip D is employed, which consists of a block 45, preferably cylindrical in general contour, as shown in Fig. 6, and this cylindrical block is provided with a cut or recess 46 in one of its faces, inclined in two directions, as is also shown in Fig. 6. A friction-roller 47, preferably covered by an elastic material, is swiveled upon one end of this block, while a set-screw 48 is placed at the opposite end, extending through into the slot. The spoke 49 of a bicycle-wheel, for example, is made to enter the slot 46, and owing to the peculiar shape of this slot when the trip-block 45 is secured on the spoke by adjusting the screw 48 to clamp the latter the friction-roller 47 will be held horizontal, and each time the wheel makes a complete revolution the friction-wheel 47 will engage with the wheel 13 of the cyclometer and move the said wheel a predetermined portion of a revolution.

In the operation of this device, when the ten pins 31 on the master or ring gear are made to face inward, at a predetermined number of revolutions of the wheel the shaft $12^a$ will be turned sufficiently to impart movement to the master-gear to such an extent as to bring one of the pins in engagement with the inner stellated gear, 27, and turn the said gear what may be termed "one tooth." In so doing the spindle 23 will be revolved and the long hand 42 will move one point on the dial, indicating one-tenth of a mile; and at the time the wheel has made one hundred revolutions, for example, the gear 33 of the hand-train will have been revolved to such an extent as to have imparted movement to the second wheel, 35, sufficiently to carry the short hand 43 to the figure "10," showing ten miles on the dial, and so on, and when the short hand shall have reached the figure "100" the gear 35 on the hand-train will have made a complete revolution, and will then move the upper stellated wheel, 36, the distance of one tooth and indicate on the smaller or auxiliary dial 41 one point, or one hundred miles. When, however, the master-gear is turned with its single pin 30 inward, the record on the dial will be multiplied by ten. The small marks on the main dial will then indicate miles instead of tenths of a mile and the figures hundreds of miles instead of simple miles, while the points on the auxiliary dial 41 will indicate thousands of miles each instead of each indicating a hundred miles. In this manner the capacity of the cyclometer may be greatly increased, and yet the instrument may be made exceedingly light, simple and durable, and very small.

Having thus described my invention, I claim as new and desire to secure by Letters Patent—

1. In a cyclometer, a master-gear having trips differently arranged upon opposite faces, the gear being reversible, and a positive train of registering-gears operated by the trips of the master-gear, as and for the purpose set forth.

2. In a cyclometer, a ring master-gear having trip devices upon opposite faces, the said gear being reversible, and a positive train of registering-gears contained within the circle of the ring-gear, as and for the purpose specified.

3. In a cyclometer, a casing, a ring-shaped master-gear in said casing provided with a trip, a driving-shaft for rotating the master-gear, a central spindle having a portion extended outward through the casing and provided with a thumb-wheel, a gear-wheel connected to the spindle within the casing, a stellated wheel adapted to be rotated by the trip on the master-gear, a pinion on the stellated wheel meshing with the gear-wheel on the spindle, a main dial fitted to the casing, a hand on the spindle and operated over the main dial, an auxiliary dial, a hand adapted to travel over the same, and the train of gearing operated from the spindle for operating the hand over the auxiliary dial, as and for the purpose set forth.

4. In a cyclometer, a casing having registering mechanism therein, a tube connected to the casing and comprising two members, one member being at substantially right angles to the other member, a worm-shaft in one of the members for driving the registering mechanism, a screw-plug in the outer end of the other member, a movable plug in said other member having a reduced portion to enter an annular groove in the worm-shaft, and a spring interposed between said two plugs, as and for the purpose specified.

5. In a cyclometer, a trip device adapted for attachment to the spokes of a wheel, comprising a body portion having a slot therein inclined in two directions and provided with a friction-roller and also with an adjusting-screw extending into the said slot, as and for the purpose specified.

GRANVILLE NUTTING.

Witnesses:
J. FRED ACKER,
JNO. M. RITTER.